United States Patent Office 3,658,851
Patented Apr. 25, 1972

3,658,851
CYCLIZATION OF CERTAIN NOPINOL COMPOUNDS TO FORM 3 - OXATRICYCLO-[5.2.0.0.$^{4,9}$]NONYL COMPOUNDS
Thomas W. Gibson, Cincinnati, and William F. Erman, Springfield Township, Hamilton County, Ohio, assignors to The Procter & Gamble Company, Cincinnati, Ohio
No Drawing. Original application Dec. 16, 1966, Ser. No. 602,132. Divided and this application May 5, 1969, Ser. No. 843,253
Int. Cl. C07d 5/32
U.S. Cl. 260—346.2                            6 Claims

ABSTRACT OF THE DISCLOSURE

A process for the preparation of cis-β-bergamotene involving a novel cyclization reaction is disclosed. The novel cyclization reaction can be used to form novel oxatricyclo[5.2.0.0$^{4,9}$] nonyl compounds. Cis-β-bergamotene and the novel oxatricyclo[5.2.2.0$^{4,9}$] nonyl compounds are useful as perfumes.

CROSS REFERENCE TO RELATED APPLICATION

This application is a divisional application of the U.S. patent application of Thomas W. Gibson and William F. Erman, Ser. No. 602,132, filed Dec. 16, 1966 and now U.S. Patent 3,481,998.

This invention relates to the synthesis of cis-β- bergamotene and therefore represents the first total synthesis of a n-substituted pinene sesquiterpene. More specifically, a multi-step process starting with readily preparable 2-carboalkoxymethylnopinol, through the formation of several novel intermediate compounds, and resulting ultimately in the formation of cis-β-bergamotene has been discovered. A key step in this process and an important feature of this invention is the cyclization of certain nopinol compounds to form novel oxatricyclo[5.2.0.0$^{4,9}$] nonyl compounds.

β-Bergamotene is a known compound, having been isolated from Valerian root oil by Kulkarni et al. as reported in Tetrahedron Letters, 8, 505 (1963). A comparison of the nuclear magnetic resonance spectrum of the β-bergamotene prepared by the present invention (Example I, infra) with that of naturally occurring β-bergamotene as reported by Kulkarni e tal. in Tetrahedron, 22, 1917 (1966) revealed the non-identity of these compounds. This non-identity is believed to reside in the cis-trans stereo configuration of said compounds. It is also to be noted that the cis structure for β-bergamotene (as shown by compound 10, FIG. I, infra) has been assigned to naturally occurring β-bergamotene in the above-cited Tetrahedron (1966) reference. However, due to the unambiguous nature of the synthesis of the present invention, it is concluded that the product obtained hereby is cis-β-bergamotene, and therefore the naturally occurring isomer is believed to be trans-β-bergamotene (as shown by compound II, FIG. I, infra).

In any event, cis-β-bergamotene (10) prepared by the process of this invention has a unique and desirable odor and thus has utility as an odorant or as a component of perfume compositions as discussed ln detail hereinafter. In addition, the novel oxatricyclo[5.2.0.0$^{4,9}$] nonyl compounds mentioned above also have utility based on their olfactory properties. Novel oxo derivatives of these oxatricyclo[5,2,0.0$^{4,9}$] nonyl compounds have also been prepared as a part of this invention and these compounds likewise have useful olfactory characteristics.

Accordingly, objects of this invention are: To provide a novel synthesis of cis-β-bergamotene; to provide novel compounds useful as intermediates in said synthesis of cis-β-bergamotene; to provide a novel cyclization reaction useful in said synthesis of cis-β-bergamotene; and to provide novel oxatricyclo[5.2.0.0$^{4,9}$] nonyl products of said cyclization reaction and derivatives thereof having useful olfactory characteristics. Further objects of this invention relating to the perfume and detergent arts will be evident hereinafter.

SYNTHESIS OF CIS-β-BERGAMOTENE

The above-described and other objects are achieved by a novel process for the synthesis of cis-β-bergamotene, which comprises:

(a) cyclizing 2-carbalkoxymethylnopinol (1) (preferably 2-carboethoxymethylnopinol) to form alkyl-1-methyl-3-oxatricyclo[5.2.0.0$^{4,9}$]nonyl-2-acetate (2) preferably alkyl is ethyl);
(b) hydrolyzing the acetate (2) of step (a) to form 1-methyl - 3 - oxatricyclo[5.2.0.0$^{4,9}$]nonyl-2-acetic acid (3);
(c) decarboxylating and halogenating the acetic acid (3) of step (b) to form 1-methyl-4-halomethyl-3-oxatricyclo[5.2.0.0$^{4,9}$]nonane (4) (preferably "halo" is chloro);
(d) cleaving the nonane (4) of step (c) to form 9-hydroxy-β-pinene (5);
(e) tosylating the pinene (5) of step (d) to form 9-toluenesulfonyloxy-β-pinene (6);
(f) displacing the pinene (6) of step (e) with sodium iodide to form 9-iodo-β-pinene (7);
(g) displacing the pinene (7) of step (f) with lithium acetylide to form 9-ethynyl-β-pinene (8);
(h) hydroborating the pinene (8) of step (g) with disiamylborane to form 9-(β-pinyl)-acetaldehyde (9); and
(i) reacting the aldehyde (9) of step (h) with triphenylisopropylidene phosphorane to form cis-β-bergamotene (10).

The above-identified process for the synthesis of cis-β-bergamotene comprising steps (a) through (i) is illustrated in FIG. I and is desicribed in more detail in Example I, infra. Step (a) is discussed in detail under "The Cyclization Reaction," infra. Respective steps (b) through (i) each involve individual reactions whose conditions are known in the art. References wherein these conditions are disclosed are summarized in Table 1. This table also shows preferred temperature conditions for each step.

TABLE 1

| Step | Preferred temperature conditions | | Reference |
|------|---------------------|---------------------|-----------|
|      | Broad range, ° C. | Narrow range (highly preferred), ° C. |  |
| (b) | 20–100 | 25–50 | N. A. Abraham et al., Compt. rend., 248, 2880 (1959). |
| (c) | 50–100 | 75–85 | J. Kochi, J. Org. Chem. 30, 3265 (1965). |
| (d) | 70–125 | 80–90 | R. C. Blume et al., J. Org. Chem., 30, 1553 (1965). |
| (e) | −5–12 | 0–10 | M. F. Ansell et al., J. Chem. Soc., 1788 (1957). |
| (f) | 40–100 | 55–65 | M. F. Ansell et al., J. Chem. Soc. 1788 (1957). |
| (g) | 0–35 | 10–30 | Copending U.S. Patent application of Erman et al., Ser. No. 549,812, filed May 13, 1966. |
| (h) | 0–40 | 0–10 | H. C. Brown et al., J. Am. Chem. Soc., 83, 3834 (1961). |
| (i) | 50–100 | 60–70 | U. H. M. Fagerlund et al., J. Amer. Chem. Soc., 79, 6473 (1961). |

FIGURE I

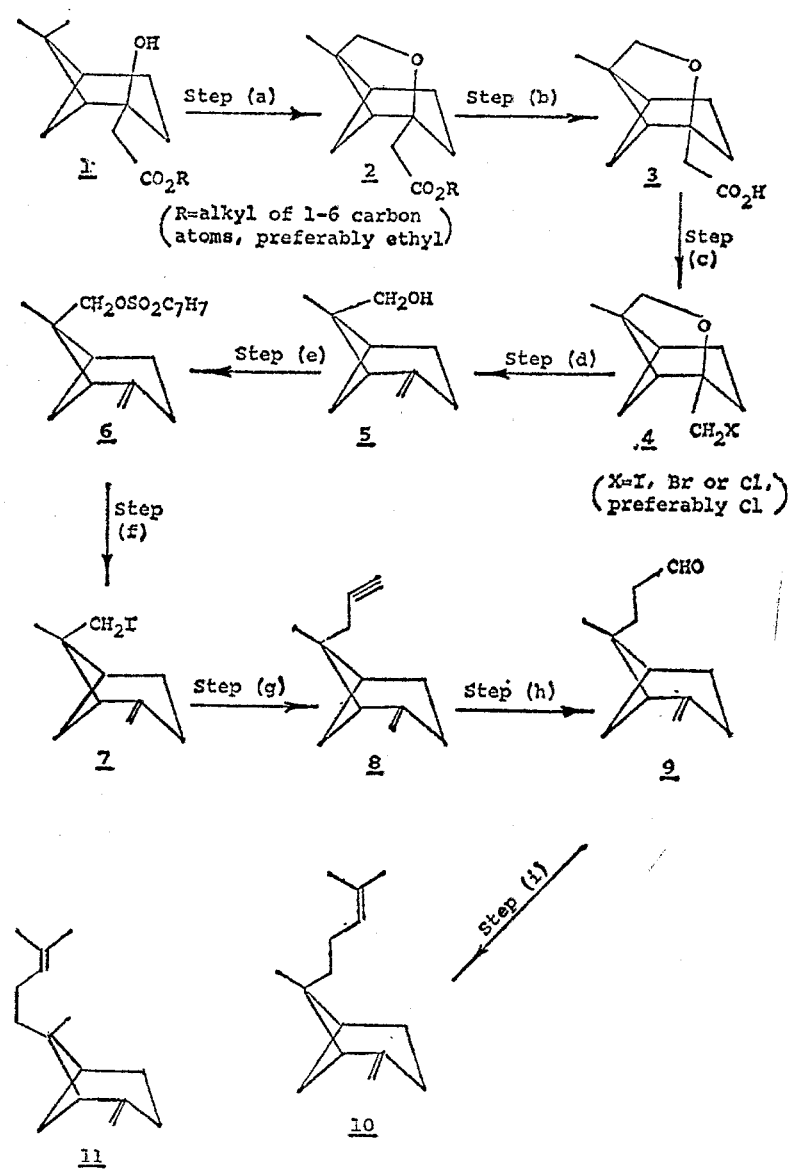

2-carboethoxymethylnopinol (1), the preferred starting material in this invention's synthesis of cis-β-bergamotene can be prepared in two steps starting with readily available β-pinene.

First, β-pinene is converted by ozonolysis to nopinone according to the method of Meinwald and Gassman as reported in J. Am. Chem. Soc., 82, 5445 (1960). Nopinone is then reacted with ethylbromoacetate and zinc to form 2-carboethoxymethylnopinol (1) according to the method of Wallach as reported in Ann., 357, 49 (1907). Substitution of other alkylbromoacetates results in the formation of corresponding 2-carboalkoxymethylnopinols which can also be used as the starting material in this invention's synthesis when "alkyl" contains from 1 to about 6 carbon atoms.

Cis-β-bergamotene (10) has a unique and desirable odor described as lemon-lime with a woody, slightly camphoraceous background with a touch of minty sweetness. This compound can be used as an odorant per se or as a component of perfume compositions for ultimate use in products such as soaps, detergents, deodorants and the like. Perfume compositions, preferably of the spice cologne type, containing odoriferously effective amounts, e.g., 0.0001% to 60%, preferably 1% to 20% of cis-β-bergamotene, are desirable and useful as illustrated in more detail in Examples VI, XI and XII, infra.

NOVEL INTERMEDIATE COMPOUNDS IN THE SYNTHESIS OF CIS-β-BERGAMOTENE

All of the compounds 2 through 9 prepared as intermediates in this invention's synthesis of cis-β-bergamotene are novel compositions of matter and can be generically defined as compounds of the general formula selected from the group consisting of Formula I 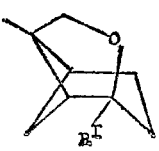 and 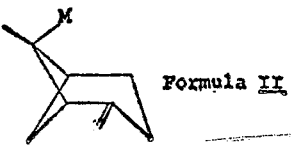 Formula II wherein: $R^I$ is selected from the group consisting of —$CH_2CO_2R^{II}$ and —$CH_2X$; $R^{II}$ is selected from the group consisting of H (3) and R (2); R is an alkyl radical of from 1 to about 6 carbon atoms; X is selected from the group consisting of I, Br and Cl (4); and M is selected from the group consisting of —$CH_2OH$ (5), —$CH_2OSO_2C_7H_7$ (6), —$CH_2I$ (7), —$CH_2C\equiv CH$ (8) and —$CH_2CH_2CHO$ (9).

Many of the above-defined compounds of Formula I and Formula II have desirable odor properties and thus have utility in the perfume arts. However, all of these compounds have primary utility as intermediates in the synthesis of cis-β-bergamotene.

THE CYCLIZATION REACTION

The cyclization of 1 to form 2 described above under "The Synthesis of cis-β-Bergamotene" (Step a) is but one embodiment of a more broadly applicable novel cyclization reaction, which comprises: reacting a nopinol compound of the general formula Formula III 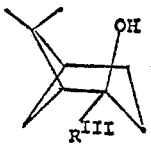

with a compound selected from the group consisting of acetates and oxides of lead, silver and mercury in the presence of molecular halogen selected from the group consisting of bromine, chlorine and iodine, to form a 3-oxatricyclo[5.2.0.0^{4,9}]nonane compound of the general formula Formula IV 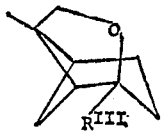

wherein in both of the above general Formulas III and IV, $R^{III}$ is selected from the group consisting of H, $R^{IV}$ and $CH_2CO_2R^V$; and $R^{IV}$ and $R^V$ are each an alkyl radical of from 1 to about 6 carbon atoms, preferably of from 1 to about 2 carbon atoms.

When $R^{III}$ is $CH_2CO_2R^V$ in Formulas III and IV, the cyclization reaction represents step (a) of the synthesis of cis-β-bergamotene. Accordingly, the preparation of the Formula III compound for $R^{III}=CH_2CO_2R^V$, 2-carboalkoxymethyl-nopinol (1), and the use of the corresponding Formula IV product, alkyl - 1-methyl-3-oxatricyclo [5.2.0.0^{4,9}] nonyl-2-acetate (2), as an intermediate in the synthesis of cis-β-bergamotene, step (b), have been described hereinbefore.

The preparation of Formula III compounds for $R^{III}=R^{IV}$ (alkyl radical of from 1 to about 6 carbon atoms, i.e., these compounds are alkylnopinols) can be accomplished by the addition of alkyllithium to nopinone (nopinone is prepared by ozonolysis of β-pinene, supra) in the same manner as reported by Huckel and Gelchscheimer in Ann., 625, 12 (1959).

The preparation of the Formula III compound for $R^{III}=H$, i.e., nopinol, can be accomplished by lithium aluminum hydride reduction of nopinone according to the method of Winstein and Holness as reported in J. Am. Chem. Soc., 77, 3054 (1955).

Examples of suitable acetate or oxides of lead, silver or mercury for the cyclization reaction are mercuric oxide, lead tetraacetate, silver acetate, silver oxide and lead oxide ($PbO_2$ or $Pb_3O_4$). $Br_2$ is the molecular halogen preferably used with mercuric oxide, silver acetate and silver oxide while $I_2$ is preferably used with lead tetraacetate. Either $Br_2$ or $I_2$ can be used equally well with lead oxide. When $I_2$ is used as the molecular halogen, it is desirable to irradiate the reactants with visible (tungsten) light during the cyclization reaction.

The cyclization reaction is preferably carried out in the presence of an inert solvent. Suitable inert solvents include: saturated hydrocarbons, preferably of from about 5 to about 12 carbon atoms, e.g., pentane, hexane, cyclohexane, dodecane and the like; aromatic hydrocarbons, preferably of from about 6 to about 9 carbon atoms, e.g., benzene or toluene; and halogenated hydrocarbons, preferably of from about 1 to about 10 carbon atoms, e.g., chloroform, ethylene dichloride and the like.

For the cyclization reaction, the concentration of the Formula III starting material in the solvent should be within the range of from about 0.01 M to about 1.0 M, preferably from about 0.1 M to about 0.5 M. At least one mole of oxide or acetate and at least one mole of molecular halogen should be present in the reaction system per mole of Formula III starting material. Preferably, the mole ratio of oxide or acetate to the Formula III material as well as the mole ratio of molecular halogen to Formula III material is within the range of from about 1.1:1 to about 5:1.

The temperature of the cyclization reaction can be within the range of from 0° C. to about 150° C., preferably, from about 10° C. to about 80° C. More preferably, the reaction is carried out at reflux conditions, i.e., at a temperature corresponding to the boiling point of the solvent used, e.g., 36° C. when pentane is the solvent. Further details on the cyclization reaction are found in Example I (step a), Example II and Example III, infra.

NOVEL PRODUCTS OF THE CYCLIZATION REACTION AND NOVEL DERIVATIVES THEREOF

The Formula IV cyclization products for $R^{III}=R^{IV}$ (alkyl radical of from 1 to about 6 carbon atoms), i.e., 1-methyl - 4 - alkyl - 3-oxatricyclo[5.2.0.0^{4,9}]nonane compounds, have fenchone-eucalyptol odors and these novel compounds therefore have utility as components of perfume compositions. These compounds can be oxidized by the addition of $CrO_3$ in the presence of acetic anhydride and acetic acid to form novel 1-methyl-4-alkyl-2-oxo-3-oxatricyclo[5.2.0.0^{4,9}]nonane compounds of the general formula Formula V 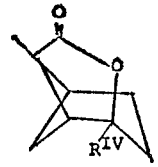

wherein $R^{IV}$ is the same as in Formula IV.

The Formula V compounds described above have a unique odor defined as pungent, pithy-stemmy with a sweet woody-animal background.

Formula IV and Formula V compounds can be used individually, or in admixture with each other, as odorants per se or as components of perfume compositions for ultimate use in products such as soaps, detergents, deodorants and the like. Prefume compositions containing odoriferously effective amounts, e.g., 0.001% to 60%, preferably 1% to 40%, of Formula IV and/or Formula V compounds, are desirable and useful. Woody-lavender type perfume compositions are particularly suited for the incorporation of Formula IV and/or Formula V compounds therein. Further details on the perfume utility of Formula IV and Formula V compounds are found in Examples VII, VIII, XI and XII, infra. A preferred Formula IV and/or Formula V compound is obtained when $R^{IV}$=methyl.

The Formula IV cyclization product for $R^{III}=H$, i.e., 1-methyl-3-oxatricyclo[5.2.0.0^{4,9}]nonane, has an odor defined as clean-camphor and this novel compound therefore has utility as a component of perfume compositions. This compound can be oxidized by the addition of $CrO_3$ in the presence of acetic anhydride and acetic acid to form the novel compound 1-methyl-2-oxo-3-oxatricyclo [5.2.0.0^{4,9}]nonane (Formula V structure, $R^{IV}$=H). This product has an odor defined as woody, tobacco, slightly butyric and can be used as an odorant per se or as a component of perfume compositions for ultimate use in products such as soaps, detergents, deodorants and the like. Perfume compositions, preferably of the woody-lavender type, containing odoriferously effective amounts, e.g., 0.0001% to 60%, preferably 1% to 40%, of 1-methyl-3-oxatricyclo[5.2.0.0$^{4,9}$]nonane and/or 1 - methyl-2-oxo-3-oxatricyclo[5.2.0.0$^{4,9}$]nonane are desirable and useful. See Examples IX, X, XI and XII, infra.

An alternative method of preparing 1-methyl-2-oxo-3-oxatricyclo[5.2.0.0$^{4,9}$]nonane starting initially with nopinone is disclosed in the copending U.S. patent application of Thomas W. Gibson, Ser. No. 602,141, filed concurrently herewith, now U.S. Patent 3,522,276.

Therefore, in summary, this invention provides novel compounds of the general formula selected from the group consisting of

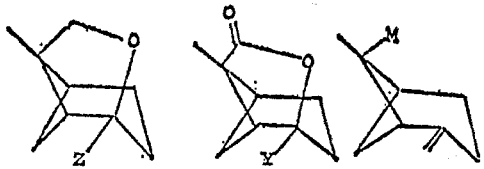

wherein: Z is selected from the group consisting of

—CH$_2$CO$_2$R$^V$

—CH$_2$CO$_2$H, —CH$_2$X, H and R$^{IV}$; Y is selected from the group consisting of H and R$^{IV}$, R$^V$ and R$^{IV}$ are each an alkyl radical of from 1 to about 6, preferably of from 1 to about 2, carbon atoms, X is selected from the group consisting of I, Br, and Cl, preferably Cl; and M is selected from the group consisting of —CH$_2$OH,

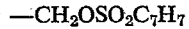
—CH$_2$OSO$_2$C$_7$H$_7$

—CH$_2$I, —CH$_2$C≡CH, and —CH$_2$CH$_2$CHO.

In the following examples, N.M.R. spectra were obtained on a Varian Associates HA–100 spectrometer. Gas chromatographic analyses were performed on an Aerograph A–90P instrument using Carbowax 20M packed columns in the range of 60°–200° C. Microanalyses were obtained on a Perkin-Elmer Infracord Spectrometer, and ultraviolet spectra were obtained from a Cary Model 14 spectrometer. All percentages and ratios in the following examples, as well as in this specification and the appended claims are by weight unless indicated otherwise. Also in the following examples, abbreviations and symbols are defined as indicated: EtOH=ethyl alcohol; Ac=acetate; Ar=argon; DMSO=dimethyl sulfoxide; THF=tetrahydrofuran; room temperature=24–26° C.

Example I.—Synthesis of cis-β-bergamotene

Step (a).—To a mixture of 20.2 g. of 2-carboethoxymethylnopinol (1, R=ethyl) and 33 g. yellow HgO in 500 ml. pentane was added 22 g. Br$_2$. During addition the pentane was kept as reflux (−36° C.) and a stream of Ar was passed through the system to remove HBr. After addition, reflux was continued for 1 hour, the mixture cooled, filtered, and dried over MgSO$_4$. Removal of drying agent and solvent gave 20.4 g. dark oil, which was filtered through 150 g. of Al$_2$O$_3$ twice to give 16.0 g. of ethyl-1-methyl-3-oxatricyclo[5.2.0.0$^{4,9}$]nonyl - 2 - acetate (2, R=ethyl) (80%), which appeared to be pure by gas chromatography. Purification was carried out by gas chromatography followed by short-path distillation to give 2 with B.P. 88° (0.2 mm.), $n_D^{26}$ 1.4755, [α]$_{5461}$+50.5° [2.04, EtOH], λ$_{max}$. 5.78, 9.7μ, and N.M.R. signals at τ8.76 (3H, triplet, J=7.1 c.p.s.), 8.74 (3H, singlet), 8.51 (1H, doublet, J=9.0 c.p.s., C$_8$-endo-H), 7.9–8.4 (6H), 7.75 (1H, quartet, J=9.0 and 4.5 c.p.s., C$_8$-exo-H), 7.44 (2H, singlet), 6.43 (2H, AB quartet, J=8.6 c.p.s., δ=44.6 c.p.s., C$_2$—CH$_2$), and 5.90 (2H, AB quartet, J=7.1 c.p.s., δ=14.0 c.p.s., C$_{13}$—CH$_2$).

Analysis.—Calculated for C$_{13}$H$_{20}$O$_3$ (percent): C, 69.61; H, 8.99. Found (percent): C, 69.65; H, 8.99.

In this part of Example I, substantially equivalent results are obtained in that 1 is cyclized to 2 (R=ethyl) when:

The pentane solvent is replaced on a volume basis by another inert solvent, e.g., a saturated hydrocarbon of from about 5 to about 12 carbon atoms such as pentane, hexane, cyclohexane or dodecane, an aromatic hydrocarbon of from about 6 to about 9 carbon atoms such as benzene or toluene, or a halogenated hydrocarbon of from about 1 to about 10 carbon atoms such as chloroform or ethylene dichloride; and/or The Br$_2$ is replaced on a mole basis by I$_2$ or Cl$_2$; And/or the HgO is replaced on a mole basis by another acetate or oxide of lead, silver or mercury, e.g., lead tetraacetate, silver acetate, silver oxide or lead oxide.

Also in this part of Example I, substantially equivalent results are obtained in that the corresponding alkyl-1-methyl-3-oxatricyclo[5.2.0.0$^{4,9}$]nonyl-2-acetate is formed when the 2-carboethoxymethylnopinol is replaced by another 2-carboalkoxymethylnopinol wherein the alkyl radical contains from 1 to about 6 carbon atoms, e.g., methyl, propyl, isopropyl, butyl, pentyl, 3-methylphenyl, and hexyl.

Steps (b) and (c).—Hydrolysis of 15.5 g. of 2 (R=ethyl) with KOH in aqueous methanol at 25° C. gave a quantitative yield of 1-methyl-3-oxatricyclo[5.2.0.0$^{4,9}$] nonyl-2-acetic acid (3). To a solution of 12.43 g. of the acid 3 at room temperature in 250 ml. benzene was added 44 g. (Pb(OAc)$_4$, and the mixture stirred until homogeneous, when 4.31 g. NaCl was added, the system evacuated repeatedly to afford an Ar atmosphere, and then heated at 80° C. overnight. As the reaction proceeded, CO$_2$ was given off and the color became lighter as Pb$^{+2}$ salts were precipitated. The solution was decanted from the gummy salts, washed with dilute HClO$_4$, saturated Na$_2$CO$_3$, saturated NaCl, dried over MgSO$_4$, filtered, the benzene removed in vacuum, and the residue chromatographed on 50 g. Al$_2$O$_3$. Elution with 10% ether in pentane gave 5.50 g. pure 1-methyl-4-chloromethyl-3-oxatricyclo [5.2.0.0$^{4,9}$]nonane (4, X=Cl). An additional 0.834 g. was obtained on rechromatography of the latter fractions. Purification by gas chromatography gave 4 with B.P. 65° (1.3 mm.), $n_D^{26}$ 1.4969, [α]$_{5461}$+46.2° [2.17, EtOH], λ$_{max}$. 9.75μ, M.W. 186 (mass spec.), and N.M.R. signals at τ8.73 (3H, singlet, 8.51 (1H, doublet, J=8.5 c.p.s.), 7.7–8.4 (7H), 6.47 (2H, singlet), and 6.35 (2H, AB quartet, J=9.0, δ=46 c.p.s.).

Analysis.—Calculated for C$_{10}$H$_{15}$ClO (percent): C, 64.33; H, 8.09; Cl, 19.10. Found (percent): C, 64.32; H, 7.89; Cl, 19.18.

In this part of Example I, substantially equivalent results are obtained in that 3 is formed when 2 is replaced by another alkyl-1-methyl-3-oxatricyclo[5.2.0.0.$^{4,9}$]nonyl-2-acetate wherein the alkyl radical contains from 1 to about 6 carbon atoms, e.g., methyl, propyl, butyl, pentyl, and hexyl.

Also in this part of Example I, substantially equivalent results are obtained in that the corresponding 1-methyl-4-halomethyl-3-oxatricyclo[5.2.0.0$^{4,9}$]nonane (4) is formed when the 4.31 g. of NaCl is replaced by NaI or NaBr.

Step (d).—To a solution of 14.4 g. of 1-methyl-4-chloromethyl-3-oxatricyclo[5.2.0.0$^{4,9}$]nonane (4) in 150 ml. dry monoglyme was added 4.6 g. sodium, and the solution refluxed overnight (85° C.). After cooling, the excess sodium was decomposed by the addition of methanol, the solution diluted with water and extracted thoroughly with ether. The ether solution was washed with water, dried over MgSO$_4$, filtered and stripped. Distillation of the residue gave 5.6 g. (48%) pure 9-hydroxy-β-pinene (5), B.P. 55° (0.5 mm.), [α]$_{5461}$+44.4° [1.80, EtOH], λ$_{max}$. 2.90, 3.22, 6.07, 9.8, and 11.36μ, M.W. 152 (mass spec.), and N.M.R. signals at τ8.70 (3H, singlet), 8.59 (1H, doublet, J=9.0 c.p.s.), 7.3–8.3 (8H), 6.67 (2H, AB quartet, J=10.6, δ=18.6 c.p.s.), and 5.40 (2H, broad singlet).

*Analysis.*—Calculated for $C_{10}H_{16}O$ (percent): C, 78.89; H, 10.59. Found (percent): C, 78.23; H, 10.27.

In this part of Example I, substantially equivalent results are obtained in that 5 is formed when the 1-methyl-4-chloromethyl-3-oxatricyclo[5.2.0.0$^{4,9}$]nonane is replaced by another 1 - methyl - 4 - halomethyl - 3 - oxatricyclo-[5.2.0.0$^{4,9}$]nonane, e.g., -iodomethyl- or -bromomethyl-.

Step (c).—To a solution of 5.20 g. of 9-hydroxy-α-pinene (5) in 90 ml. dry pyridine at 0° was added 6.55 g. toluene-sulfonyl chloride (tosylate), and the solution put in a 0° refrigerator overnight. The mixture was poured onto ice, extracted with ether, the ether washed with dilute HCl, saturated $NaHCO_3$, dried over $MgSO_4$, filtered and stripped. Crystallization of the residue from ether-pentane gave 7.4237 g. pure 9-toluenesulfonyloxy-β-pinene (6) (71%) M.P. 115°, $\lambda_{max}$ 3.22, 6.10, 6.27, 7.33, 8.51, 10.4 and 11.3μ, and N.M.R. signals at τ8.79 (3H, singlet), 8.61 (1H, doublet, J=9.2 c.p.s.), 7.4–8.4 (7H), 7.60 (3H, singlet), 6.33 (2H, AB quartet, J=9.4, δ=26 c.p.s.), 5.50 (2H, broad), and 2.5 (4H).

*Analysis.*—Calculated for $C_{17}H_{22}SO_3$ (percent): C, 66.65; H, 7.34; S, 10.44. Found (percent): C, 66.58; H, 7.27; S, 10.48.

Step (f).—A solution of 4.20 g. of 6 and 5.60 g. of NaI in 50 ml. of purified acetone was refluxed for 18 hours (55° C.). After cooling in an ice bath to ~10° C. and filtration of the sodium tosylate, the acetone was removed in vacuum and the oily residue taken up in ether. The ether solution was washed with a dilute $Na_2SO_3$ solution and dried over $MgSO_4$. Distillation of the residue after filtration and removal of ether gave 3.20 g. (89%) of 9-iodo-β-pinene (7), B.P. 66° (0.4 mm.), $n_D^{27}$ 1.5625, [α]$_{5461}$+76.8° [1.63, EtOH], $\lambda_{max.}$ 6.08 and 11.37μ, and N.M.R. signals at τ8.65 (3H, singlet), 8.68 (1H, doublet, J=9.5 c.p.s.), 7.3–8.3 (7H), 7.04 (2H, AB quartet, J=9.4, δ=16.5 c.p.s.), and 5.35 (2H, broad).

*Analysis.*—Calculated for $C_{10}H_{15}I$ (percent): C, 45.84; H, 5.77; I, 48.39. Found (percent): C, 45.93; H, 5.84; I, 48.50.

Step (g).—A solution of 2.4748 g. of 7 and 1.72 g. of the ethylene-diamine complex of lithium acetylide in 50 ml. DMSO was stirred at room temperature under Ar for 20 hours. The solution was poured into water, neutralized with $NH_4Cl$ solution, and extracted with pentane. The pentane solution was washed with saturated NaCl solution, dried over $NaSO_4$, filtered and stripped. Short-path distillation of the residue gave 1.0673 g. (71%), B.P.~50° (0.5 mm.), which showed two peaks on gas chromatography in the ratio of 4:1 (planimeter). Spectral data for material giving the minor peak suggested an internal isomer while the major product was shown to be the desired product, 9-ethynyl-β-pinene (8). Pure material showed $n_D^{27}$ 1.4975, [α]$_{5461}$ +41° [1.95,EtOH], $\lambda_{max.}$ 3.00, 3.22, 4.70, 6.08 and 11.37μ, M.W. 160 (mass spec.), and N.M.R. signals δ8.63 (3H, singlet), 8.57 (1H, doublet, J=9.6 c.p.s.), 7.4–8.3 (10H), and 5.40 (2H, broad doublet).

*Analysis.*—Calculated for $C_{12}H_{16}$ (percent): C, 89.94; H, 10.06. Found (percent): C, 89.78; H, 9.97.

Step (h).—To a solution of 0.303 g. of the mixture of products obtained in Step (g) in 20 ml. THF, cooled in an ice bath (10° C.), was added 2.0 ml. of 1 M disiamylborane by syringe. The solution was then stirred four hours at room temperature, decomposed with 2 ml. of 3 N NaOH and 2 ml. of 30% $H_2O_2$, poured into water, and the water solution extracted with pentane. The pentane extract was dissolved with water, dried over $Na_2SO_4$, filtered and stripped to give 0.320 g. crude product. Gas chromatography analysis indicated the presence of a number of compounds, the major peak of which (~30%) was shown to be the desired product, 9-(β-pinyl)-acetaldehyde (9). Material collected by gas chromatography showed B.P. 90–5° (0.6 mm.), $\lambda_{max.}$ 3.23, 3.68, 5.76, 6.08 and 11.4μ, M.W. 178 (mass spec.), and N.M.R. signals at δ 8.81 (3H, singlet), 8.57 (1H, doublet, J=9.0 c.p.s.), 7.4–8.4 (11H), 5.40 (2H, broad doublet), and 0.30 (1H, triplet, J=1.5 c.p.s.).

*Analysis.*—Calculated for $C_{12}H_{18}O$ (percent): C, 80.85; H, 10.18. Found (percent): C, 80.15; H, 10.13.

Step (i).—Triphenylisopropylidenephosphorane was generated from 1.93 g. of triphenylisopropylphosphonium bromide in 50 ml. THF by the addition of one equivalent of butyl lithium. After two hours at room temperature, 0.305 g. of 9 [1] was added and the mixture heated to 60° overnight. After cooling, the mixture was poured into water, extracted with pentane, and the pentane washed with water, dried over $MgSO_4$, filtered and stripped to give 0.235 g. crude product. This material was filtered through 6 g. $Al_2O_3$ to give 0.099 g. hydrocarbons, consisting of 90% (+)-cis-β-bergamotene (10) and 10% acetylenes. Purification gave (+)-cis-β-bergamotene with B.P. ~105° (0.5 mm.). [α]$_D^{25}$ +40.2° [1.74, CHCl$_3$], $\lambda_{max.}$ 3.22, 6.06, 11.43 and 11.95μ, M.W. 204 (mass spec.), N.M.R. signals at τ8.77 (3H, singlet), 8.59 (1H, doublet, J=9.5 c.p.s.) 8.42 (3H, singlet) 8.34 (3H, singlet), 7.4–8.3 (11H), 5.40 (2H, doublet), and 4.93 (1H, triplet) J=8.0 c.p.s.), and an odor characterized as lemon-lime with a woody, slightly camphoraceous background with a touch of minty sweetness.

*Analysis.*—Calculated for $C_{15}H_{24}$ (percent): C, 88.16; H, 11.84. Found (percent): C, 87.93; H, 11.16.

As is evident from Example I, each of the products 2 through 9 has utility as an intermediate in the synthesis of cis-β-bergamotene.

Example II.—Cyclization of alkylnopinol to form 1-methyl-4-alkyl-3-oxatricyclo(5.2.0.0$^{4.9}$)nonane (Formula IV, $R^{III}=R^{IV}$)

To a solution of 100.8 g. of methylnopinol (Formula III, $R^{III}=R^{VI}$=methyl) in 1 liter distilled pentane was added 200 g. yellow mercuric oxide. The mixture was heated to reflux (~36° C.) under $N_2$ and 20.0 ml. bromine added dropwise over about two hours. After an additional two hours reflux at ~36° C., the mixture was cooled, filtered and dried over $MgSO_4$ and $Na_2CO_3$. Filtration through 450 g. $Al_2O_3$ followed by vacuum distillation gave 69.0 g. of 1,4-dimethyl-3-oxatricyclo[5.2.0.0$^{4,9}$] nonane, B.P. 64° (10.5 mm.), and 15 g. nopinone, for an 82% yield of pure product material purified by gas chromatography showed $n_D^{26}$1.4702, [α]$_{5461}$ +51.7° [3.0, EtOH], strong infrared absorption at 9.7μ, M.W. 152 (mass spec.), N.M.R. signals at τ8.74 (6H, singlet), 7.8–8.7 (8H), and an AB quartet at τ6.40 (2H, J=9.0 c.p.s., δ/J=5.1), and an odor characterized as fenchone eucalyptol.

*Analysis.*—Calculated for $C_{10}H_{16}O$ (percent): C, 78.89; H, 10.59. Found (percent): C, 78.21; H, 10.49.

In this example, substantially equivalent results are obtained in that the corresponding 1-methyl-4-alkyl-3-oxatricyclo[5.2.0.0$^{4,9}$]nonane is formed when the methylnopinol is replaced by another alkylnopinol wherein the alkyl radical contains from 1 to about 6 carbon atoms, e.g., ethyl, propyl, isopropyl, butyl, pentyl, and hexyl.

Also in this example, substantially equivalent results are obtained in that 1,4-dimethyl-3-oxatricyclo[5.2.0.0$^{4,9}$] nonane is formed when:

The pentane is replaced on a volume basis by another inert solvent, e.g., one of the solvents listed under step (a) of Example I, supra; and/or The bromine is replaced on a mole basis by $Cl_2$, or $I_2$ and the reaction mixture is irradiated with a 500 watt tungsten light; and/or The mercuric oxide is replaced on a mole basis by another acetate or oxide of lead, silver or mercury, e.g., lead tetraacetate, silver acetate, silver oxide or lead oxide.

---

[1] As the crude product described in Step (h).

Example III.—Oxidation of 1-methyl-4-alkyl-3-oxatricyclo[5.2.0.0$^{4,9}$]nonane to form 1-methyl-4-alkyl-2-oxo-3-oxatricyclo[5.2.0.0$^{4,9}$]nonane (Formula V)

A solution of 4.093 g. of 1,4-dimethyl-3-oxatricyclo [5.2.0.0$^{4,9}$]nonane prepared as in Example II was heated to 100° in 30 ml. acetic anhydride, and a solution of 4.30 g. CrO$_3$ in 100 ml. acetic acid and 10 ml. H$_2$O was added over 1.5 hours. After cooling and addition of 10 ml. ethanol to destroy excess oxidant the solution was poured onto crushed ice, extracted with ether, and the ether extract washed with saturated Na$_2$CO$_3$ solution and dried over MgSO$_4$. Distillation of the residue after removal of drying agent and solvent gave 1.047 g. nearly pure starting material and 2.414 g. (72%) of 1,4-dimethyl-2-oxo-3-oxatricyclo[5.2.0.0$^{4,9}$]nonane. This product had B.P. 84° (1.2 mm.), [α]$_{5461}$+58.8° [2.16, EtOH], λ$_{max}$. 5.64 (CCl$_4$), M.W. 166 (mass spec.), N.M.R. signals at τ 8.64 (3H, singlet), 8.55 (3H, singlet), 8.32 (1H, doublet, J=9.7 c.p.s.), 8.10 (4H, singlet), and 7.5–7.8 (3H), and an odor characterized as pungent, pithy-stemmy with a sweet woody-animal background.

*Analysis.*—Calculated for C$_{10}$H$_{14}$O$_2$ (percent): C, 72.26; H, 8.49. Found (percent): C, 72.12; H, 8.56.

In this example, substantially equivalent results are obtained in that the corresponding 1-methyl-4-alkyl-2-oxa-3-oxatricyclo[5.2.0.0$^{4,9}$]nonane is formed when the 4-methyl radical in the starting material is replaced by another alkyl radical of from about 2 to about 6 carbon atoms, e.g., ethyl, propyl, butyl, sec-butyl, pentyl, and hexyl.

Example IV.—Cyclization of nopinol to form 1-methyl-3-oxatricyclo[5.2.0.0$^{4,9}$]nonane (Formula IV, R$^{III}$=H)

A solution of 2.0 g. nopinol (Formula III, R$^{III}$=H) in 175 ml. distilled pentane was treated with 8.0 g. HgO and 0.8 ml. Br$_2$ as described in Example II, followed by a one hour~36° C. reflux period. Workup as in Example II gave, on distillation, 1.214 g. of pure 1-methyl-3-oxatricyclo[5.2.0.0$^{4,9}$]nonane plus a higher boiling fraction of 0.467 g. containing 60% product and 40% nopinone; yield 75%. The product showed B.P. 60° (9.0 mm.), $n_D^{27}$ 1.4828, [α]$_{5461}$+82.5° [2.86, EtOH], λ$_{max}$. 9.63 and 9.78μ, M.W. 138 (mass spec.), N.M.R. signals at τ 8.69 (3H, singlet), 8.48 (1H, doublet, J=9.0 c.p.s., C$_8$—H), 7.8–8.4 (6H), 7.63 (1H, quartet, J=5.6 c.p.s, C$_9$—H), 6.39 (2H, AB quartet, J=8.8 c.p.s., δ=47.0 c.p.s., C$_2$—H), 5.44 (1H, broad doublet, J=6.4 c.p.s.), and had an odor characterized as clean camphor.

*Analysis.*—Calculated for C$_9$H$_{14}$O (percent): C, 78.21; H, 10.21. Found (percent): C, 78.29; H, 10.18.

In this example, substantially equivalent results are obtained in that 1-methyl-3-oxatricyclo[5.2.0.0$^{4,9}$]nonane is formed when:

The pentane is replaced on a volume basis by another inert solvent, e.g., a saturated hydrocarbon of from about 5 to about 12 carbon atoms such as pentane, hexane, cyclohexane or dodecane, an aromatic hydrocarbon of from about 6 to about 9 carbon atoms such as benzene or toluene, or a halogenated hydrocarbon of from about 1 to about 10 carbon atoms such as chloroform or ethylene dichloride; and/or The Br$_2$ is replaced on a mole basis by I$_2$ or Cl$_2$; and/or The HgO is replaced on a mole basis by another acetate or oxide of lead, silver or mercury, e.g., lead tetraacetate, silver acetate, silver oxide or lead oxide.

Example V.—Oxidation of 1-methyl-3-oxatricyclo [5.2.0.0$^{4,9}$]nonane to form 1-methyl-2-oxo-3-oxatricyclo[5.2.0.0$^{4,9}$]nonane (Formula V structure, R$^{IV}$=H)

Oxidation of 9.9 g. of 1-methyl-3-oxatricyclo[5.2.0.0$^{4,9}$] nonane was carried out as described in Example III for 1,4-dimethyl-3-oxatricyclo[5.2.0.0$^{4,9}$]nonane to give 12.5 g. crude product, which was hydrolyzed with excess KOH in aqueous methanol for one hour on a steam bath at ~70° C. After removal of methanol in vacuum, extraction with ether gave 2.6 g. neutral materials consisting of starting other and nopinone. The aqueous phase was acidified with dilute HCl and extracted with ether and methylene chloride to give, after drying and distillation, 3.3 g. (31%) pure 1-methyl-2-oxo-3-oxatricyclo[5.2.0.0$^{4,9}$] nonane, B.P. 83–4° (0.7 mm.), [α]$_{5461}$+129° [2.61, EtOH), λ$_{max}$. 5.64μ, M.W. 152 (mass spec.), and N.M.R. signals at τ 8.68 (3H, singlet), 8.30 (1H, doublet, J=9.6 c.p.s.), 8.09 (4H, singlet), 7.6–7.8 (2H), 7.31 (1H, quartet), and 5.07 (1H, doublet, J=6.6 c.p.s.). This compound had an odor characterized as woody, tobacco, slightly butyric.

*Analysis.*—Calculated for C$_9$H$_{12}$O$_2$ (percent): C, 71.02; H, 7.95. Found (percent): C, 70.71; H, 7.99.

Example VI.—Perfume compositions utilizing cis-β-bergamotene

A perfume composition is prepared by intermixing the components shown below.

| Component: | Percent by weight |
|---|---|
| cis-β-bergamotene | 10.00 |
| Bergamot | 40.00 |
| Geranium bourbon | 25.00 |
| Patchouli | 5.00 |
| Sandalwood E.I. | 5.00 |
| Neroli bigarade | 5.00 |
| Cassia | 5.00 |
| Musk ambrette | 5.00 |
| | 100.00 |

This perfume composition exhibits a highly desirable and useful spice cologne odor.

The components and proportions in the perfume composition of this example can be adjusted according to methods well known in the perfume art to form a wide variety of perfume compositions containing odoriferously effective amounts of cis-β-bergamotene.

Example VII.—Perfume compositions utilizing 1-methyl - 4 - alkyl - 3 - oxatricyclo[5.2.0.0$^{4,9}$]nonane compounds A perfume composition is prepared by intermixing the components shown below.

| Component: | Percent by weight |
|---|---|
| 1,4 - dimethyl - 3 - oxatricyclo[5.2.0.0$^{4,9}$]nonane | 1.00 |
| Lemon | 10.00 |
| Bergamot | 12.00 |
| Lavender | 30.00 |
| Sandalwood | 15.00 |
| Patchouli | 9.00 |
| Labdanum | 4.00 |
| Musk ambrette | 15.00 |
| Rosemary | 1.00 |

This perfume composition exhibits a highly desirable and useful woody lavender odor. A substantially identical perfume composition is obtained when another 1-methyl-4 - alkyl - 3 - oxatricyclo[5.2.0.0$^{4,9}$]nonane compound, wherein the alkyl radical contains from 2 to about 6 carbon atoms (e.g., ethyl, propyl, isopropyl, butyl, pentyl, and hexyl), is substituted on a weight basis for the 1,4-dimethyl-3-oxatricyclo[5.2.0.0$^{4,9}$]nonane.

The components and proportions in the perfume composition of this example can be adjusted according to methods well known in the perfume art to form a wide variety of perfume compositions containing odoriferously effective amounts of the 1-methyl - 4 - alkyl - 3 - oxatricyclo[5.2.0.0$^{4,9}$]nonane compounds of this invention.

Example VIII.—Perfume compositions utilizing 1 - methyl - 4 - alkyl - 2 - oxo - 3 - oxatricyclo[5.2.0.0$^{4,9}$]nonane compounds A perfume composition is prepared by intermixing the components shown below.

| Component: | Percent by weight |
|---|---|
| 1,4 - dimethyl - 2 - oxo - 3 - oxatricyclo[5.2.0.0$^{4,9}$]nonane | 1.00 |
| Lemon | 10.00 |
| Bergamot | 12.00 |
| Lavender | 30.00 |
| Sandalwood | 15.00 |
| Patchouli | 9.00 |
| Labdanum | 4.00 |
| Musk ambrette | 15.00 |
| Rosemary | 1.00 |

This perfume composition exhibits a higly desirable and useful woody lavender odor. A substantially identical perfume composition is obtained when another 1-methyl-4-alkyl - 2 - oxo - 3 - oxatricyclo[5.2.0.0$^{4,9}$]nonane compound, wherein the alkyl radical contains from 2 to about 6 carbon atoms (e.g., ethyl, propyl, isopropyl, butyl, pentyl, and hexyl), is substituted on a weight basis for the 1,4-dimethyl-2-oxo-3-oxatricyclo[5.2.0.0$^{4,9}$]nonane.

The components and proportions in the perfume composition of this example can be adjusted according to methods well known in the perfume art to form a wide variety of perfume compositions containing odoriferously effective amounts of the 1-methyl-4-alkyl-2-oxo-3-oxatricyclo[5.2.0.0$^{4,9}$]nonane compounds of this invention.

Example IX.—Perfume compositions utilizing 1-methyl-3-oxatricyclo[5.2.0.0$^{4,9}$]nonane A perfume composition is prepared by intermixing the components shown below.

| Component: | Percent by weight |
|---|---|
| 1-methyl-3-oxatricyclo[5.2.0.0$^{4,9}$]nonane | 1.00 |
| Lemon | 10.00 |
| Bergamot | 12.00 |
| Lavender | 30.00 |
| Sandalwood | 15.00 |
| Patchouli | 9.00 |
| Labdanum | 4.00 |
| Musk ambrette | 15.00 |
| Rosemary | 1.00 |

This perfume composition exhibits a highly desirable and useful woody-lavender odor.

The components and proportions in the perfume composition of this example can be adjusted according to methods well known in the perfume art to form a wide variety of perfume compositions containing odoriferously effective amounts of 1-methyl - 3 - oxatricyclo[5.2.0.0$^{4,9}$]nonane.

Example X.—Perfume compositions utilizing 1-methyl-2-oxo-3-oxatricyclo[5.2.0.0$^{4,9}$]nonane A perfume composition is prepared by intermixing the components shown below.

| Component: | Percent by weight |
|---|---|
| 1-methyl - 2 - oxo - 3 - oxatricyclo[5.2.0.0$^{4,9}$]nonane | 1.00 |
| Lemon | 10.00 |
| Bergamot | 12.00 |
| Lavender | 30.00 |
| Sandalwood | 15.00 |
| Patchouli | 9.00 |
| Labdanum | 4.00 |
| Musk ambrette | 15.00 |
| Rosemary | 1.00 |

This perfume composition exhibits a highly desirable and useful woody-lavender odor.

The components and proportions in the perfume composition of this example can be adjusted according to methods well known in the perfume art to form a wide variety of perfume compositions containing odoriferously effective amounts of 1 - methyl - 2 - oxo - 3 - oxatricyclo[5.2.0.0$^{4,9}$]nonane.

Example XI.—Detergent compositions

A conventional heavy-duty built detergent having the following composition is prepared.

| Component: | Percent by weight |
|---|---|
| Sodium dodecyl benzene sulfonate | 20.00 |
| Sodium tripolyphosphate | 50.00 |
| Sodium silicate | 6.00 |
| Sodium sulfate | 14.00 |
| Water | 9.80 |
| Perfume composition of Example VI containing cis - β - bergamotene | 0.20 |

This detergent composition exhibits a desirable spice cologne odor. When the perfume composition of either Examples VII or VIII is substituted on a weight basis for the perfume composition of Example VI herein, the detergent composition exhibits a desirable woody lavender odor. When the perfume composition of either Example IX or X is substituted on a weight basis for the perfume composition of Example VI herein, the detergent composition exhibits a desirable woody-lavender odor.

Other detergent compositions, e.g., those disclosed in U.S. Patents 3,159,581 and 3,213,030 can be substituted herein with equally satisfactory results.

Example XII.—Detergent bar compositions

A conventional household detergent bar having the following composition is prepared.

| Component: | Percent by weight |
|---|---|
| Sodium soap | 75.00 |
| Potassium soap (the total soap comprises a mixture of 80% tallow soap and 20% coconut soap) | 7.50 |
| Water | 15.00 |
| Perfume composition of Example VI containing cis-β-bergamotene | 2.50 |

This detergent bar composition exhiibts a desirable spice cologne odor. When the perfume composition of either Example VII or VIII is substituted on a weight basis for the perfume composition of Example VI herein, the detergent bar composition exhibits a desirable woody lavender odor. When the perfume composition of either Example IX or X is substituted on a weight basis for the perfume composition of Example VI herein, the detergent bar composition exhibits a desirable woodylavender odor.

Other detergent bars, e.g., those disclosed in U.S. Patents 2,215,539, 2,295,594, 2,407,647 and 3,066,354, can be substituted herein with equally satisfactory results.

What is claimed is:

1. A novel cyclization process, which comprises: reacting a nopinol compound of the general formula

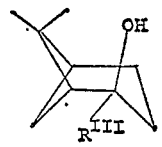

with a compound selected from the group consisting of acetates and oxides of lead, silver and mercury in the presence of molecular halogen selected from the group consisting of bromine, chlorine and iodine, to form a 3-oxatricyclo[5.2.0.0$^{4,9}$]nonane compound of the general formula

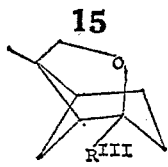

wherein in both of the above general formulas: $R^{III}$ is selected from the group consisting of H, $R^{IV}$ and $CH_2CO_2R^V$; and $R^{IV}$ and $R^V$ are each an alkyl radical of from 1 to about 6 carbon atoms.

2. The process of claim 1 wherein $R^{IV}$ and $R^V$ are each an alkyl radical of from 1 to about 2 carbon atoms.

3. The process of claim 1 wherein the acetates and oxides are selected from the group consisting of mercuric oxide, lead tetraacetate, silver acetate, silver oxide, and lead oxide.

4. The process of claim 1 wherein the reaction is carried out in an inert solvent.

5. The process of claim 4 wherein the inert solvent is selected from the group consisting of saturated hydrocarbons, aromatic hydrocarbons, and halogenated hydrocarbons.

6. The process of claim 5 wherein the concentration of the nopinol compound in the solvent is within the range of from about 0.01 m. to about 1.0 m, the mole ratio of a compound of claim 3 to the nopinol compound is within the range of from about 1.1:1 to about 5:1, and the mole ratio of molecular halogen to the nopinol compound is within the range of from about 1.1:1 to about 5:1.

References Cited

Shibata et al.: Chem Ab., vol. 61, 1964, 10712 g.

ALEX MAZEL, Primary Examiner

B. I. DENTZ, Assistant Examiner

PO-1050
(5/69)

UNITED STATES PATENT OFFICE
CERTIFICATE OF CORRECTION

Patent No. 3,658,851          Dated April 25, 1972

Inventor(s) Thomas W. Gibson and William F. Erman

It is certified that error appears in the above-identified patent and that said Letters Patent are hereby corrected as shown below:

Column 1, line 33, "n-substituted" should be -- π-substituted.
        line 60, "II" should be -- 11 --.
        line 64, "1n" should be -- in --.
        line 68, "[5,2,0.0$^{4,9}$] should be -- [5.2.0.0$^{4,9}$] --.

Column 2, line 18, "(2) preferably" should be -- (2) (preferably --.

Column 7, line 58, "as reflux (−36°C.)" should be -- at reflux (∼36°C.) --.

Column 8, line 31 "(Pb(OAc)$_4$" should be -- Pb(OAc)$_4$ --.

Column 9, line 10 "Step (c)" should be -- Step (e) --.
        line 47 "NaSO$_4$" should be -- Na$_2$SO$_4$ --.
        line 56 "68.63" should be -- τ8.63 --.

Column 10, line 1 "δ 8.81" should be -- τ 8.81 --.
        line 33 "(5.2.0.0$^{4,9}$)" should be [5.2.0.0$^{4,9}$] --.
        line 37 "R$^{VI}$" should be -- R$^{IV}$ --.

Column 12, line 5 "othet" should be -- ether --.

Signed and sealed this 7th day of November 1972.

(SEAL)
Attest:

EDWARD M. FLETCHER, JR.
Attesting Officer

ROBERT GOTTSCHALK
Commissioner of Patents